United States Patent
Fujiwara

(10) Patent No.: US 8,559,057 B2
(45) Date of Patent: Oct. 15, 2013

(54) IMAGE PROCESSING DEVICE, IMAGE FORMING APPARATUS, AND IMAGE PROCESSING METHOD GENERATING DOUBLE COLOR IMAGE DATA WITH HIGH CONTRAST AND RICH TONE

(75) Inventor: Michiko Fujiwara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 367 days.

(21) Appl. No.: 13/022,925

(22) Filed: Feb. 8, 2011

(65) Prior Publication Data

US 2011/0194129 A1 Aug. 11, 2011

(30) Foreign Application Priority Data

Feb. 10, 2010 (JP) .................................. 2010-028175

(51) Int. Cl.
 *G06F 15/00* (2006.01)
 *G06K 1/00* (2006.01)
 *H04N 1/60* (2006.01)
 *G06F 3/08* (2006.01)

(52) U.S. Cl.
 USPC .......................................... 358/1.9; 358/518

(58) Field of Classification Search
 None
 See application file for complete search history.

(56) References Cited

U.S. PATENT DOCUMENTS

| | | | |
|---|---|---|---|
| 5,128,748 A * | 7/1992 | Murakami et al. | 358/500 |
| 5,680,230 A | 10/1997 | Kaburagi et al. | |
| 5,696,611 A | 12/1997 | Nishimura et al. | |
| 5,781,842 A * | 7/1998 | Ito et al. | 399/382 |
| 6,459,419 B1 | 10/2002 | Matsubayashi | |
| 2005/0062990 A1 | 3/2005 | Fujishige et al. | |
| 2008/0055677 A1 | 3/2008 | Minamino | |

FOREIGN PATENT DOCUMENTS

| | | |
|---|---|---|
| JP | 8-84268 A | 3/1996 |
| JP | 8-139942 A | 5/1996 |
| JP | 10-164380 A | 6/1998 |
| JP | 2005-64703 A | 3/2005 |
| JP | 2008-66933 A | 3/2008 |

\* cited by examiner

*Primary Examiner* — Douglas Tran

(74) *Attorney, Agent, or Firm* — Birch, Stewart, Kolasch & Birch, LLP

(57) ABSTRACT

An image processing device calculates saturation of each pixel on the basis of multicolor image data; determines a pixel as a chromatic/achromatic pixel based on a threshold value; generates achromatic pixel data for formation of an image using only a color material of black; generates chromatic pixel data constituting a double color image and containing single color image data for formation of an image realized by a combination of color materials; generates for the chromatic pixel, single color image data such that the consumption of a color material of a chromatic color corresponding to the single color increases with increase in the saturation of the chromatic pixel. This makes it possible to generate double color image data by which high contrast and rich tone reproduction can be realized and the boundary between the achromatic region and the chromatic region can be expressed with natural gradation.

8 Claims, 6 Drawing Sheets

FIG. 5

| Specified Color | Before Color Balance Adjustment | | | After Color Balance Adjustment | | |
|---|---|---|---|---|---|---|
| | C(Cyan) | M(Magenta) | Y(Yellow) | C(Cyan) | M(Magenta) | Y(Yellow) |
| R(Red) | 0 | 255 | 255 | 0 | 210 | 210 |
| G(Green) | 255 | 0 | 255 | 200 | 0 | 210 |
| B(Blue) | 255 | 255 | 0 | 240 | 155 | 0 |
| C(Cyan) | 255 | 0 | 0 | 200 | 0 | 0 |
| M(Magenta) | 0 | 255 | 0 | 0 | 230 | 0 |
| Y(Yellow) | 0 | 0 | 255 | 0 | 0 | 230 |

FIG. 6

| | Input RGB Values | | | | Lightness L | Saturation S | | Determination Of Region | | After Gamma Correction Process | | | | | After Color Balance Adjustment | | | |
|---|---|---|---|---|---|---|---|---|---|---|---|---|---|---|---|---|---|---|
| | R | G | B | | | | | | | C | M | Y | K | | C | M | Y | K |
| Example 1 | 0 | 0 | 0 | ⇧ | 0 | 0 | ⇧ | Achromatic | ⇧ | 0 | 0 | 0 | 255 | ⇧ | 0 | 0 | 0 | 255 |
| Example 2 | 255 | 255 | 255 | ⇧ | 0 | 225 | ⇧ | Achromatic | ⇧ | 0 | 0 | 0 | 14 | ⇧ | 0 | 0 | 0 | 14 |
| Example 3 | 255 | 0 | 0 | ⇧ | 107 | 122 | ⇧ | Chromatic | ⇧ | 64 | 64 | 64 | 101 | ⇧ | 0 | 53 | 53 | 101 |
| Example 4 | 0 | 255 | 0 | ⇧ | 113 | 198 | ⇧ | Chromatic | ⇧ | 69 | 69 | 69 | 29 | ⇧ | 0 | 57 | 57 | 29 |
| Example 5 | 0 | 0 | 255 | ⇧ | 131 | 67 | ⇧ | Chromatic | ⇧ | 90 | 90 | 90 | 184 | ⇧ | 0 | 74 | 74 | 184 |
| Example 6 | 255 | 255 | 0 | ⇧ | 95 | 220 | ⇧ | Chromatic | ⇧ | 53 | 53 | 53 | 16 | ⇧ | 0 | 44 | 44 | 16 |
| Example 7 | 255 | 0 | 255 | ⇧ | 111 | 135 | ⇧ | Chromatic | ⇧ | 67 | 67 | 67 | 82 | ⇧ | 0 | 55 | 55 | 82 |
| Example 8 | 0 | 255 | 255 | ⇧ | 53 | 204 | ⇧ | Chromatic | ⇧ | 21 | 21 | 21 | 25 | ⇧ | 0 | 17 | 17 | 25 |
| Example 9 | 255 | 128 | 128 | ⇧ | 55 | 155 | ⇧ | Chromatic | ⇧ | 22 | 22 | 22 | 60 | ⇧ | 0 | 18 | 18 | 60 |
| Example 10 | 128 | 255 | 128 | ⇧ | 74 | 204 | ⇧ | Chromatic | ⇧ | 35 | 35 | 35 | 25 | ⇧ | 0 | 29 | 29 | 25 |
| Example 11 | 128 | 128 | 255 | ⇧ | 69 | 131 | ⇧ | Chromatic | ⇧ | 31 | 31 | 31 | 88 | ⇧ | 0 | 26 | 26 | 88 |
| Example 12 | 255 | 255 | 128 | ⇧ | 61 | 221 | ⇧ | Chromatic | ⇧ | 26 | 26 | 26 | 16 | ⇧ | 0 | 21 | 21 | 16 |
| Example 13 | 255 | 128 | 255 | ⇧ | 74 | 162 | ⇧ | Chromatic | ⇧ | 35 | 35 | 35 | 54 | ⇧ | 0 | 29 | 29 | 54 |
| Example 14 | 128 | 255 | 255 | ⇧ | 39 | 209 | ⇧ | Chromatic | ⇧ | 13 | 13 | 13 | 22 | ⇧ | 0 | 11 | 11 | 22 |

IMAGE PROCESSING DEVICE, IMAGE FORMING APPARATUS, AND IMAGE PROCESSING METHOD GENERATING DOUBLE COLOR IMAGE DATA WITH HIGH CONTRAST AND RICH TONE

This Nonprovisional application claims priority under 35 U.S.C. §119(a) on Patent Application No. 2010-028175 filed in Japan on Feb. 10, 2010, the entire contents of which are hereby incorporated by reference.

TECHNICAL FIELD

The present invention relates to an image processing device that generates image data of a double color image composed of an achromatic color and a single chromatic color.

BACKGROUND ART

Conventionally known as a technique of an image forming apparatus capable of full-color image formation is a technique of converting image data for full-color printing into image data of a double color image composed of an achromatic color and a single chromatic color in order to print the double color image.

For example, Patent Literature 1 discloses the following technique. That is, color image data for a pixel whose saturation is lower than a predetermined value is corrected in such a manner that values of R, G, and B for the pixel are converted to be equal to each other. At the image formation based on the color image data having been subjected to the correction, an image composed of only K is formed for the pixel having the equal values of R, G, and B, while an image composed of any one of Y, M, and C is generated for the other pixel.

Further, Patent Literature 2 discloses a color image processing device including: achromatic color determining means that determines if a color to which a pixel is dedicated is an achromatic color or a chromatic color on the basis of multi-value data of each of the colors, R, G, and B; binarization process means that binarizes multi-value data of each of the colors R, G, and B and then outputs the binarized data; and color converting means that generates achromatic color data on the basis of the binarized data, for a pixel which has been determined to dedicate to an achromatic color, and then outputs the achromatic color data, while outputting the binarized data without modifying, for the pixel which has been determined to dedicate to a chromatic color.

CITATION LIST

Patent Literatures

Patent Literature 1
Japanese Patent Application Publication, Tokukai, No. 2005-064703 A (Publication Date: Mar. 10, 2005)
Patent Literature 2
Japanese Patent Application Publication, Tokukaihei, No. 8-139942 A (Publication Date: May 31, 1996)

SUMMARY OF INVENTION

Technical Problem

However, the techniques disclosed in Patent Literatures 1 and 2 have the problem of a sudden tone change in the boundary between an achromatic region and a chromatic region and the problem of image quality degradation caused by decrease in contrast of the chromatic region.

The present invention has been attained in view of these problems, and an object of the present invention is to generate a high-contrast double color image data that can express the boundary between the achromatic region and the chromatic region with natural gradation and exhibit rich tone reproduction.

Solution to Problem

In order to solve the above-described problems, an image processing device of the present invention is an image processing device that generates double color image data for formation of a double color image on a basis of multicolor image data which is image data of a multicolor image, the double color image being expressed by (i) a black color material and (ii) a single chromatic color material or a combination of a plurality of chromatic color materials and being composed of black and other single color, the image processing device comprising: a saturation calculating section that calculates saturation of each pixel on a basis of the multicolor image data; a pixel determining section that determines a pixel as a chromatic pixel if the saturation of the pixel having been calculated by the saturation calculating section is not less than a preset threshold value, and determines a pixel as an achromatic pixel if the saturation of the pixel having been calculated by the saturation calculating section is less than the threshold value; an achromatic color data generating section that generates pixel data for formation of a black image, for the pixel having been determined as the achromatic pixel by the pixel determining section; a chromatic color data generating section that generates pixel data containing single color image data for formation of an image of the single color, for the pixel having been determined as the chromatic pixel by the pixel determining section; and a pixel data synthesizing section that generate the double color image data by combining the pixel data having been generated for the achromatic pixel by the achromatic color data generating section and the pixel data having been generated for the chromatic pixel by the chromatic color data generating section, the chromatic color data generating section generating, for the chromatic pixel, the single color image data such that a density of the single color increases with increase in the saturation of the chromatic pixel having been calculated by the saturation calculating section.

Further, an image processing method of the present invention is an image processing method of generating double color image data for formation of a double color image on a basis of multicolor image data which is image data of a multicolor image, the double color image being expressed by (i) a black color material and (ii) a single chromatic color material or a combination of a plurality of chromatic color materials and being composed of black and other single color, the method comprising: a saturation calculating step of calculating saturation of each pixel on a basis of the multicolor image data; a pixel determining step of determining a pixel as a chromatic pixel if the saturation of the pixel having been calculated in the saturation calculating step is not less than a preset threshold value, and determining a pixel as an achromatic pixel if the saturation of the pixel having been calculated in the saturation calculating step is less than the threshold value; an achromatic color image data generating step of generating pixel data for formation of a black image, for the pixel having been determined as the achromatic pixel in the pixel determining step; a chromatic color image data generating step of generating pixel data containing single color image data for formation of an image of the single color, for the pixel having been determined as the chromatic pixel in the pixel determining step; and a pixel data synthesizing step of generating the double color image data by combining the pixel data having been generated for the achromatic pixel in the achromatic color image data generating step and the pixel data having been generated for the chromatic pixel in the chromatic color image data generating step, in the chromatic color image data generating step, generating the single color image data, for the chromatic pixel, such that a density of the single color increases with increase in the saturation of the chromatic pixel having been calculated in the saturation calculating step.

Advantageous Effects of Invention

According to the image processing device and image processing method of the present invention, the saturation of each pixel is calculated on the basis of the multicolor image data, a pixel is determined as the chromatic pixel if the saturation of the pixel thus calculated is not less than the preset threshold value, and a pixel is determined as the achromatic pixel if the saturation of the pixel thus calculated is less than the threshold value. Pixel data for formation of a black image is generated for the pixel having been determined as the achromatic pixel, and pixel data containing single color image data for formation of an image of the single color is generated for the pixel having been determined as the chromatic pixel. Further, for the chromatic pixel, the single color image data is generated such that a density of the single color increases with increase in the saturation of the chromatic pixel thus calculated.

In this manner, the single color image data is generated, for the chromatic pixel, such that a density of the single color increases with increase in the saturation of the chromatic pixel thus calculated. This makes it possible to form a high-contrast double color image that exhibits rich tone reproduction. Moreover, it is possible to express the boundary between the chromatic region consisting of a group of the chromatic pixels and the achromatic region consisting of a group of the achromatic pixels, with natural and smooth gradation.

BRIEF DESCRIPTION OF DRAWINGS

FIG. 5 is an explanatory view showing an example of the result of color balance adjustment process performed by a color balance adjusting section that is provided in a double color correction section shown in FIG. 1.

FIG. 6 is an explanatory view showing an example of the result of color correction process performed by the double color correction section shown in FIG. 1.

DESCRIPTION OF EMBODIMENTS

The following will describe one embodiment of the present invention. A case mainly described in the present embodiment is such that the present invention is applied to an image processing device provided in a digital color multifunction printer. However, this is not intended to limit a target to which the present invention is applied. The present invention can be applied to an image processing device only if it generates double color image data used to form a double color image on the basis of multicolor image data which is image data of a multicolor image, the double color image being expressed by (i) a black color material and (ii) a single chromatic color material or a combination of a plurality of chromatic color materials and being composed of black and other single color.

Figure 2:
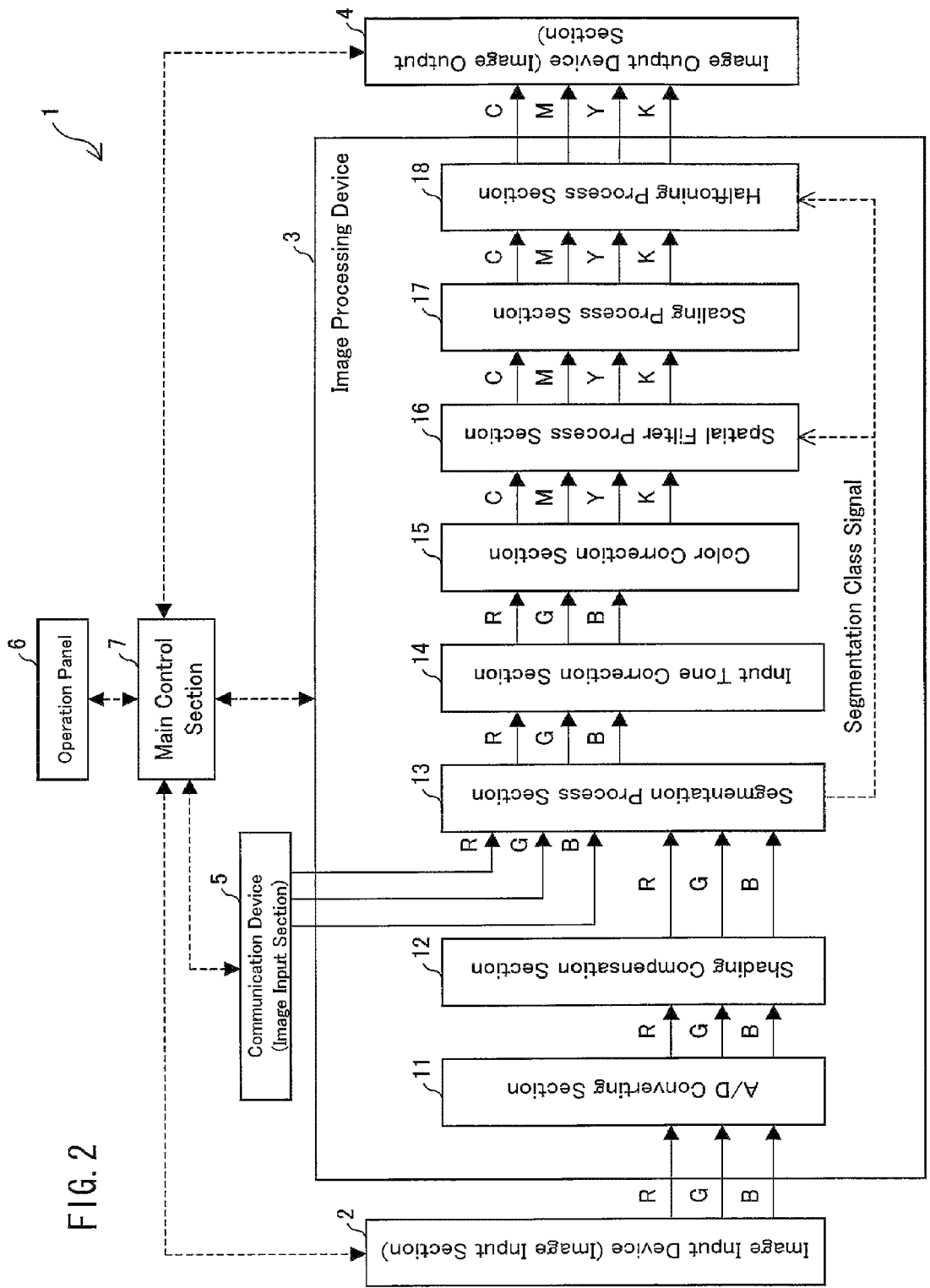
FIG. 2 is a block diagram schematically showing the arrangement of an image forming apparatus according to one embodiment of the present invention.

FIG. 2 is a block diagram schematically showing the arrangement of a digital color multifunction printer (image forming apparatus) 1 according to the present embodiment. As shown in FIG. 2, the digital color multifunction printer 1 includes an image input device (image input section) 2, an image processing device 3, an image output device (image output section) 4, a communication device (image input section) 5, an operation panel 6, and a main control section 7.

The image input device 2 reads an image of a document to generate image data (document image data). The image input device 2 is composed of a scanner (not shown) including a CCD (Charge Coupled Device) for converting optical information into an electric signal. In the present embodiment, the image input device 2 reads an optical image reflected from an original document as RGB (R: Red, G: Green, B: Blue) analog signals and supplies the RGB analog signals to the image processing device 3. Note that the arrangement of the image input device 2 is not particularly limited. For example, the image input device 2 may read a document set on a scanner platen or may read a document being carried by document carrying means.

As shown in FIG. 2, the image processing device 3 includes an A/D converting section 11, a shading compensation section 12, a segmentation process section 13, an input tone correction section 14, a color correction section 15, a spatial filter process section 16, a scaling process section 17, and a halftoning process section 18.

The A/D converting section 11 converts the RGB analog signals supplied from the image input device 2 into RGB digital signals and then outputs the RGB digital signals to the shading compensation section 12.

The shading compensation section 12 removes various distortions produced in an illumination system, an image focusing system, and an image sensing system of the image input device 2 from the RGB digital signals transmitted from the A/D converting section 11, and then supplies the resultant digital RGB signals to the segmentation process section 13.

The segmentation process section 13 separates each pixel of an input image into either one of a text region, a halftone dot region, or a photograph (continuous tone) region, according to the RGB signals supplied from the shading compensation section 12 or the communication device 5. On the basis of a result of the separation, the segmentation process section 13 outputs a segmentation class signal, indicating which region a pixel of the input image belongs to, to the spatial filter process section 16 and the halftoning process section 18. The segmentation process section 13 also outputs the RGB signal as received from the shading compensation section 12 or the communication device 5 to the input tone correction section 14 without any modification. The spatial filter process section 16 and the halftoning process section 18 each performs processing suitable for each region on the basis of a segmentation class signal supplied from the segmentation process section 13. A method for performing segmentation process is not particularly limited and may be any of various publicly known methods.

The input tone correction section 14 adjusts color balance of the RGB signals supplied from the segmentation process section 13 and converts each signal into a signal such as a density (pixel value) signal which can be processed easily by an image processing system used in the image processing device 3. Further, the input tone correction section 14 removes background density and adjusts image quality such as contrast. Still further, the input tone correction section 14 outputs the RGB signal having been subjected to the processes mentioned above to the color correction section 15.

The color correction section 15 converts the RGB signals (full-color image data, multicolor image data) supplied from the input tone correction section 14 into CMYK signals (C: Cyan, M: Magenta, Y: Yellow, K: Black). The color correction section 15 also subjects the CMYK signals to a process for enhancing color reproducibility and then outputs the resultant CMYK signals to the spatial filter process section 16.

The digital color multifunction printer 1 according to the present embodiment has a full-color print mode, a monochrome print mode, a double color print mode (print mode using K and other single color (specified color) realized by a combination of CMY). In the digital color multifunction printer 1, color correction process based on any of the modes is performed according to instructions from the main control section 7.

Figure 3:
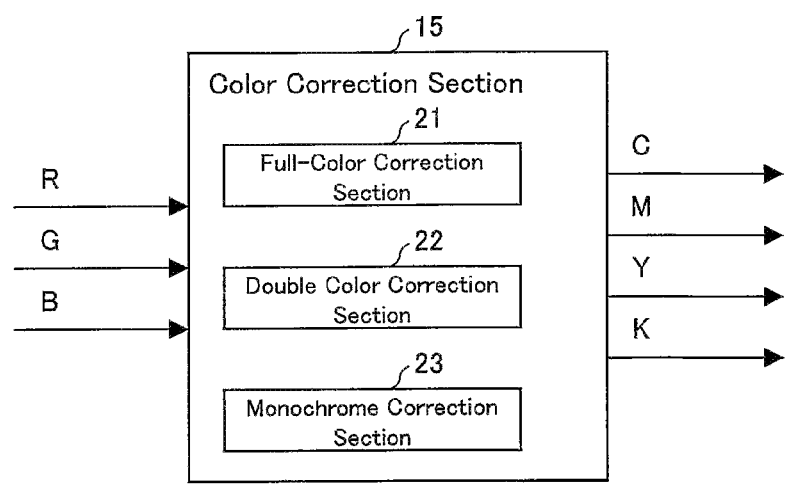
FIG. 3 is a block diagram schematically showing the arrangement of a color correction section provided in the image forming apparatus shown in FIG. 2.

More specifically, as shown in FIG. 3, the color correction section 15 includes a full-color correction section 21, a double color correction section 22, and a monochrome correction section 23. In the full-color print mode, the full-color correction section 21 is used to convert the RGB signals into CMYK signals adaptable for full-color printing. In the double color print mode, the double color correction section 22 is used to convert the RGB signals into CMYK signals adaptable for double color printing. In the monochrome print mode, the monochrome correction section 23 is used to convert the RGB signals into single color (typically K) image signals adaptable for monochrome printing. The main control section 7 selects any one of the above-described modes according to instructions entered by the user via the operation panel 6 or user's instructions received from other device by the communication device 5, and controls the color correction section 15 in accordance with the mode thus selected.

The full-color correction section 21 and the monochrome correction section 23 can perform color correction process by any of various publicly known methods. On the other hand, the double color correction section 22 performs color correction process by a method unique to the present invention to generate double color image data by which the boundary between an achromatic region and a chromatic region can be expressed with natural gradation and by which the chromatic region is displayed with high contrast. Details of the double color correction section 22 will be described later.

With the use of a digital filter, the spatial filter process section 16 performs a spatial filter processing (emphasizing process and/or smoothing process) on the basis of a segmentation class signal, with respect to the image data which is received in the form of the CMYK signals supplied from the color correction section 15. In the spatial filter processing, the spatial filter process section 16 corrects a space frequency characteristic, so as to reduce blur or granularity deterioration in an output image. Further, the spatial filter process section 16 outputs the CMYK signals having been subjected to spatial filter processing to the scaling process section 17.

The scaling process section 17 enlarges or reduces the image data being composed of CMYK signals supplied from the spatial filter process section 16 to a size as instructed from the main control section 7, and then outputs the resultant image data to the halftoning process section 18.

The halftoning process section 18 subjects the image data supplied from the scaling process section 17 to an output gamma correction process and a tone reproduction process (halftone generation process). The output gamma correction process is performed so that an image corresponding to the image data can be outputted onto a printing medium, such as a sheet of paper, by the image output device 4. The tone reproduction process is performed so that the image data is segmented into pixels and each tone of the pixels can be reproduced.

The image data having been subjected to the processes mentioned above by the image processing device 3 is temporarily stored in memory (not shown). Thereafter, the image data is read at a predetermined timing and supplied to the image output device 4.

The image output device 4 outputs the image data having been subjected to the processes mentioned above by the image processing device 3 onto a printing medium. The arrangement of the image output device 4 is not particularly limited. For example, the image output device 4 may be an image output device that uses an electrophotographic method or an inkjet method.

The communication device 5 is composed of a modem or a network card, for example. The communication device 5 communicates with other device connected to a network (e.g., a personal computer, a server device, a display device, other digital multifunction printer, a facsimile device, and the like) via a network card, a LAN cable, and the like. The communication device 5 outputs image data (RGB signals) having been received from other device to the segmentation process section 13 of the image processing device 3. The communication device 5 also outputs to the main control section 7 various configuration information items including driver (printer driver) configuration information received from the above-described other device.

The operation panel 6 includes, for example, a display section (not shown) such as a liquid crystal display and setting buttons (not shown). The operation panel 6 causes the display section to display information corresponding to an instruction of the main control section 7 and transmits information, entered by the user with use of the setting buttons, to the main control section 7. The user can enter, via the operation panel 6, various information items such as a processing mode, the number of images to be printed, and a size of a sheet, with respect to the input image data.

The main control section 7 is composed of a CPU (Central Processing Unit) and the like, for example. In accordance with a program or various data stored in a ROM (not shown) or the like, information which is entered by the user via the operation panel 6, various configuration information items received from other device by the communication device 5, and the like, the main control section 7 controls operations of the respective sections of the digital color multifunction printer 1.

Next, details of the double color correction section 22 will be described. In the double color print mode, the double color correction section 22 generates CMYK image data (double color image data) for formation of a double color image using K and other single color (specified color) realized by a combination of color materials of CMY, on the basis of the RGB full-color image data (multi-value image data). The specified color is not particularly limited. In the present embodiment, the specified color is a color selected from R (Red), G (Green), B (Blue), C (Cyan), M (Magenta), and Y (Yellow) by the user via the operation panel 6 or other device that communicates with the digital color multifunction printer 1.

Figure 1:
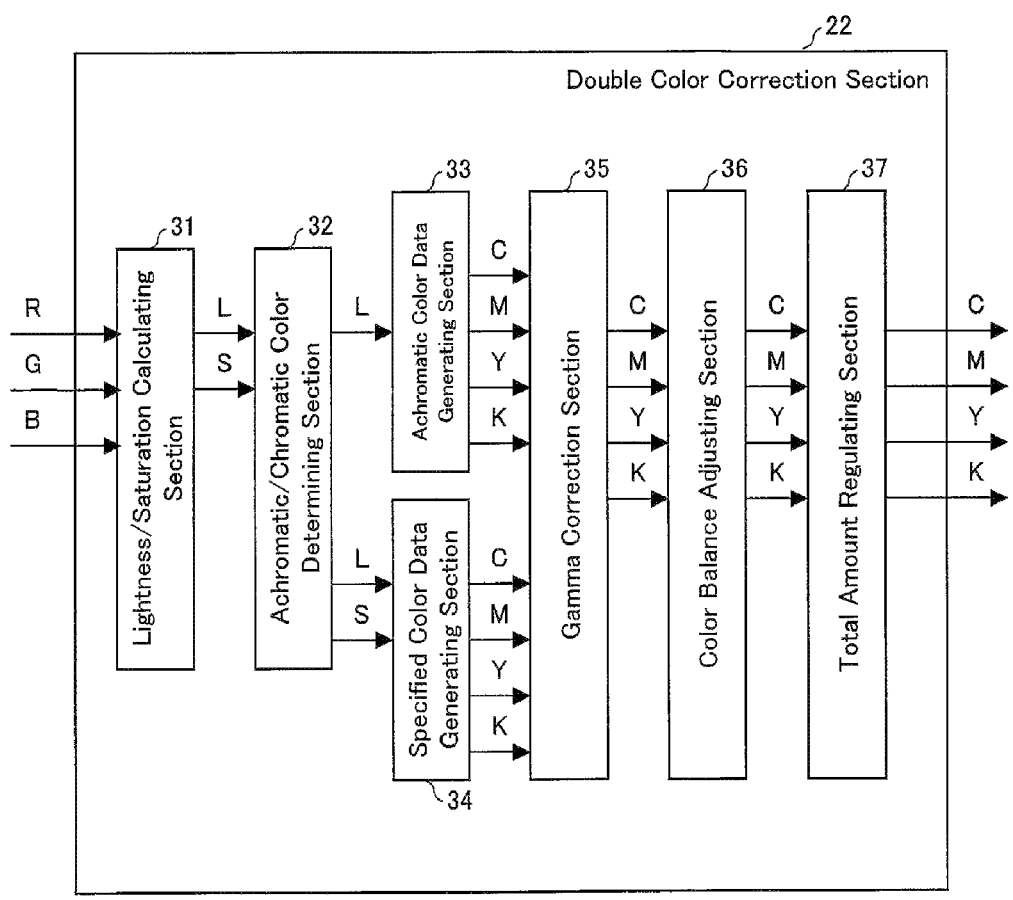
FIG. 1 is a block diagram showing the arrangement of a double color correction section provided in a color correction section shown in FIG. 3.

FIG. 1 is a block diagram showing the arrangement of the double color correction section 22. As shown in FIG. 1, the double color correction section 22 includes a lightness/saturation calculating section 31, an achromatic/chromatic color determining section 32, an achromatic color data generating section 33, a specified color data generating section 34, a gamma correction section 35, a color balance adjusting section 36, and a total amount regulating section 37.

The lightness/saturation calculating section (lightness calculating section, saturation calculating section) 31 calculates lightness L and saturation S from the RGB signals supplied from the input tone correction section 14, and then outputs a result of the calculation to the achromatic/chromatic color determining section 32. A method for calculating the lightness L and the saturation S is not particularly limited. In the present embodiment, the lightness L and the saturation S are calculated by the following equation.

$$\begin{pmatrix} X \\ Y \\ Z \end{pmatrix} = \begin{pmatrix} 0.4361 & 0.3851 & 0.1431 \\ 0.2225 & 0.7169 & 0.0606 \\ 0.0139 & 0.0971 & 0.7141 \end{pmatrix} \begin{pmatrix} R \\ G \\ B \end{pmatrix}$$

$$Xn = 0.9643$$

$$Yn = 1.0000$$

$$Zn = 0.8251$$

$$a^* = 500((X/Xn)^{1/3} - (Y/Yn)^{1/3})$$

$$b^* = 200((Y/Yn)^{1/3} - (Z/Zn)^{1/3})$$

$$L = 116(Y - Yn)^{1/3} - 16$$

$$S = \sqrt{(a^{*2} - b^{*2})}$$

In the present embodiment, the lightness/saturation calculating section 31 performs calculation of lightness and calculation of saturation. However, this is not the only possibility. Alternatively, a lightness calculating section and a saturation calculating section may be independently provided (both of which are not shown) so that the lightness calculating section performs calculation of lightness and the saturation calculating section performs calculation of saturation.

The achromatic/chromatic color determining section (pixel determining section) 32 compares a value of the saturation S supplied from the lightness/saturation calculating section 31 with a preset threshold value (10 in the present embodiment) to determine a pixel as an achromatic pixel if the saturation S of the pixel is less than the threshold value and determine a pixel as a chromatic pixel if the saturation S of the pixel is not less than the threshold value. Further, the achromatic/chromatic color determining section 32 determines a region consisting of a group of the achromatic pixels adjacent to each other as an achromatic region, and determines a region consisting of a group of the chromatic pixels adjacent to each other as a chromatic region. For the achromatic pixel, the achromatic/chromatic color determining section 32 outputs the lightness L of the achromatic pixel to the achromatic color data generating section 33. For the chromatic pixel, the achromatic/chromatic color determining section 32 outputs the lightness L and saturation S of the chromatic pixel to the specified color data generating section 34.

The achromatic color data generating section 33 calculates a value of K (black image data) for the achromatic pixel according to a proportional equation (e.g. K=−L+255) in which the value of K decreases with increase of the lightness L, generates pixel data such that values of C, M, and Y are set at zero, and then outputs CMYK pixel data to the gamma correction section 35. That is, the achromatic color data generating section 33 generates CMYK pixel data, for a pixel (achromatic pixels) which belongs to the achromatic region, such that the values of C, M, and Y are set at zero, and the value of K is set so that a density of K increases with decrease in the lightness L of the achromatic pixel having been calculated by the lightness/saturation calculating section 31.

For a pixel in the chromatic region, the specified color data generating section (chromatic color data generating section) 34 calculates (i) values of C, M, and Y (single color image data) of the specified color proportional to the saturation S of the chromatic pixel according to a proportional equation in which the values of C, M, Y increase with increase of the saturation S (for example, if the specified color is red, C=0, M=S, and Y=S; if the specified color is green, C=S, M=0, and Y=S; if the specified color is blue, C=S, M=S, and Y=0; if the specified color is cyan, C=S, M=0, and Y=0; if the specified color is magenta, C=O, M=S, and Y=0; and if the specified color is yellow, C=0, M=0, and Y=S), and (ii) a value of K (black image data) according to a proportional equation (e.g., K=−L+255) in which the value of K decreases with increase of the lightness L. Then, the specified color data generating section 34 outputs, to the gamma correction section 35, CMYK pixel data generated in accordance with the values of C, M, and Y and the value of K. That is, the specified color data generating section 34 generates pixel data (single color pixel data) of the specified color, for the chromatic pixel, in such a manner that a density of the specified color increases with increase in the saturation S of the chromatic pixel having been calculated by the lightness/saturation calculating section 31. Further, the specified color data generating section 34 generates black image data, for the chromatic pixel, such that a density of K increases with decrease in the lightness L of the chromatic pixel having been calculated by the lightness/saturation calculating section 31. The black image data and single color image data thus generated are combined with each other, and the resultant data is regarded as pixel data of the chromatic pixel.

The gamma correction section (pixel data synthesizing section) 35 generates double color image data by combining pixel data items of the respective pixels having been generated by the achromatic color data generating section 33 and the specified color data generating section 34. The gamma correction section 35 also subjects the double color image data to gamma correction process using a K's correction coefficient preset in association with the value of the lightness L and a CMY's correction coefficient preset in association with the value of the saturation S. These correction coefficients may be subjected to fine adjustment by the user according to his/her preference.

Figure 4A:
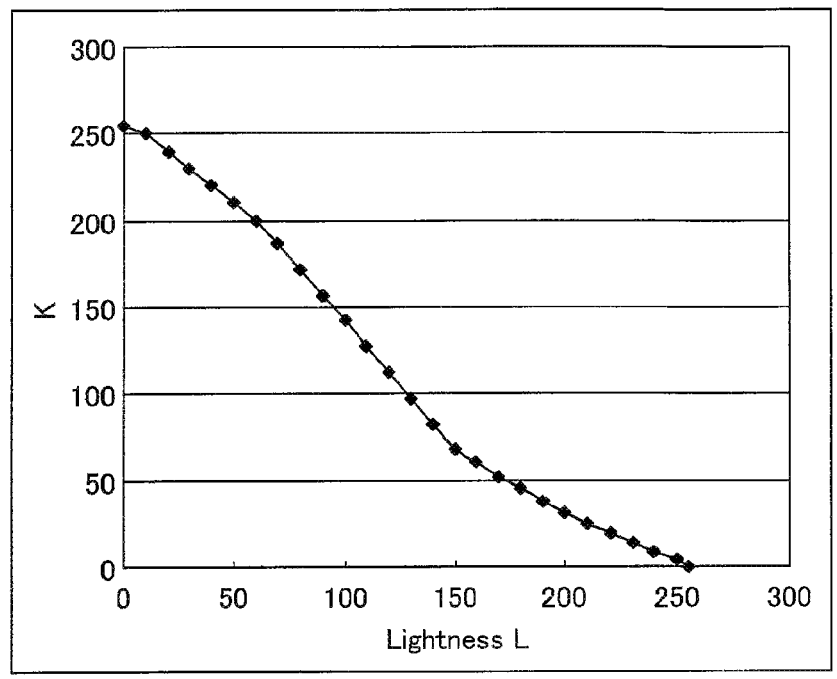
FIG. 4(a) is a graph showing an example of a color correction table, wherein the values of K after the color correction process and the gamma correction process are plotted against the values of lightness.
Figure 4B:
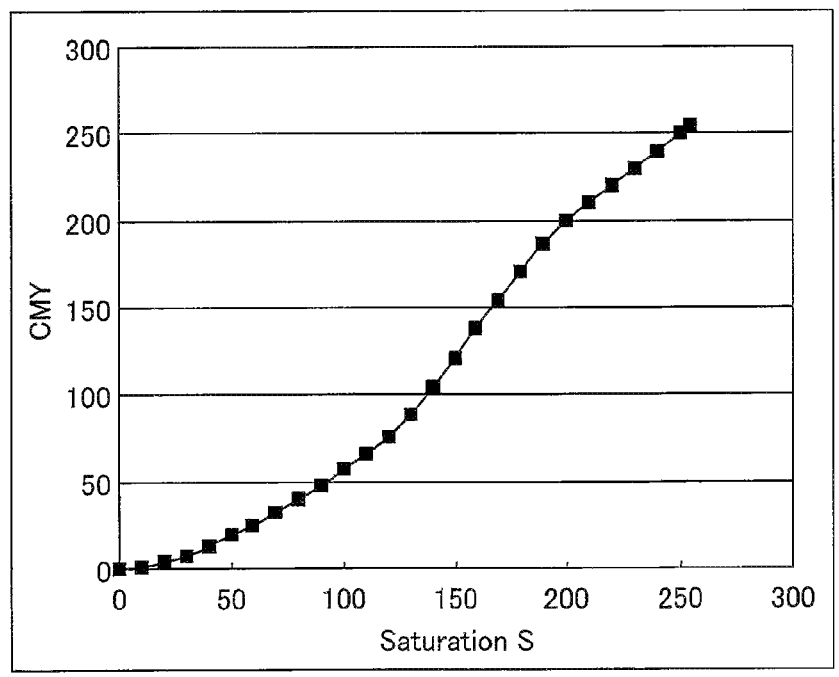
FIG. 4(b) is a graph showing an example of a color correction table, wherein the values of CMY after the color correction process and the gamma correction process are plotted against the values of lightness and saturation.

In the present embodiment, the CMYK pixel data having been generated by the achromatic color data generating section 33 and the specified color data generating section 34 is subjected to gamma correction process by the gamma correction section 35. However, this is not the only possibility. For example, the following alternative arrangement may be adopted. That is, color correction tables for K and the specified color are previously prepared in consideration of the color conversion process for converting full-color image data into double color image data and the gamma correction process. Using these color correction tables, the achromatic color data generating section 33 and the specified color data generating section 34 generate the CMYK pixel data having been subjected to the color conversion process and the gamma correction process, on the basis of the lightness L and saturation S of each pixel. FIG. 4(a) is a graph showing an example of the color correction table, wherein the values of K after the color conversion process and the gamma correction process are plotted against the values of the lightness L. FIG. 4(b) is a graph showing an example of the color correction table, wherein the values of CMY after the color conversion process and the gamma correction process are plotted against the values of the lightness L and the saturation S (Note that at least one of C, M, and Y is used depending upon what color is selected as the specified color, and the values of the unused colors are set at zero).

The color balance adjusting section 36 performs color balance adjustment process for finely adjusting the hue of the specified color, and then outputs the CMYK image data having been subjected to color balance adjustment to the total amount regulating section 37. FIG. 5 is an explanatory view showing an example of variations of the values of C, M, and Y before and after color balance adjustment process for each of the specified colors when the saturation S is a maximum value. For example, when the saturation S is less than the maximum value, the values of C, M, and Y before subjected to color balance adjustment are multiplied, for each of the specified colors, by a ratio of the values of C, M, and Y before subjected to color balance adjustment to the values of C, M, and Y after subjected to color balance adjustment, in order to give the values of C, M, and Y after subjected to color balance adjustment.

FIG. 6 is an explanatory view showing, in a case where the specified color is red (double color image of black and red is to be formed), examples of (i) the results of calculations of the lightness L and saturation S for a plurality of pixels with different input RGB values, (ii) the results of determination if a pixel belongs to the achromatic region or the chromatic region, (iii) the values of C, M, Y, and K after subjected to color correction process and gamma correction process, and (iv) the values of C, M, Y, and K after subjected to color balance adjustment process. As in the case where the specified color is red in FIG. 5, the maximum values of M and Y in the color balance adjustment process are each set at 210.

For a pixel that is expected to exceed an upper limit for the total amount of toner (color material), the total amount regulating section 37 corrects the CMYK image data so that the amount of toner to be consumed is not greater than the upper limit, and then outputs the corrected CMYK image data to the spatial filter process section 16. Note that the upper limit for the total amount of toner is a predetermined value of the total amount of toners (color materials) of C, M, Y, and K to be consumed for image formation performed by the image output device 4 on the basis of the CMYK image data having been subjected to color balance adjustment. For example, assume that the amounts of toners of C, M, Y, and K to be consumed before subjected to the regulation are C1, M1, Y1, and K1, respectively. In this case, for a pixel satisfying 300<K1+C1+M1+Y1, the values of C, M, and Y are corrected so that C2, M2, and Y2, which are the amounts of toners of C, M, and Y to be consumed after subjected to the regulation, satisfy the following equations:

$$C2=C1-((K1+C1+M1+Y1)-300)/3;$$

$$M2=M1-((K1+C1+M1+Y1)-300)/3; \text{ and}$$

$$Y2=Y1-((K1+C1+M1+Y1)-300)/3.$$

As described above, in the digital color multifunction printer 1 according to the present embodiment, the specified color data generating section 34 generates the single color image data, for the chromatic pixel, such that a density of a specified color (single color other than black), which is one of the color components of the double color image, increases with increase in the saturation S of the chromatic pixel having been calculated by the lightness/saturation calculating section 31. This makes it possible to form a high-contrast double color image that expresses the boundary between the achromatic region and the chromatic region with natural and smooth gradation and exhibits rich tone reproduction.

Further, for the achromatic pixel, the achromatic color data generating section 33 generates pixel data such that a density of black increases with decrease in the lightness L of the achromatic pixel having been calculated by the lightness/saturation calculating section 31. This makes it possible to increase contrast of the achromatic region.

Still further, for the chromatic pixel, the specified color data generating section 34 generates pixel data for forming an image composed of the specified color and black, such that a density of black increases with decrease in its lightness L of the chromatic pixel having been calculated by the lightness/saturation calculating section 31. This makes it possible to further increase contrast of the chromatic region.

In the present embodiment, the pixel data containing black and the specified color is generated for all of the chromatic pixels. However, this is not the only possibility. For example, the following alternative arrangement may be adopted. That is, the pixel data containing black and the specified color is generated for the chromatic pixels that belong to an area which is at a distance of less than a predetermined value from the boundary between the chromatic region and the achromatic region adjacent to the chromatic region, among all the chromatic pixels that belong to the chromatic region. On the other hand, the pixel data containing only the specified color without black (image data of K=0) is generated for the other chromatic pixels that belong to an area which is at a distance of not less than the predetermined value from the boundary.

Further, after the pixel data containing black and the specified color is calculated for each of the chromatic pixels, the black image data may be corrected so that a density of black decreases with distance from the boundary between the chromatic region to which the chromatic pixel belongs and the achromatic region adjacent to the chromatic region.

Still further, the case having been described in the present embodiment is such that the present invention is applied to the digital color multifunction printer 1 having (i) the function of a copier that forms an image corresponding to image data having been read by the image input device 2 on a printing medium and (ii) the function of a printer that forms an image corresponding to image data having been received via the communication device 5 on a printing medium. However, this is not the only possibility. For example, the present invention may be applied to an apparatus having only the function of the copier or an apparatus having only the function of the printer.

The arrangement having been described in the present embodiment is such that the digital color multifunction printer 1 has the full-color print mode, the double color print mode, and the monochrome print mode. However, this is not the only possibility. It is essential only that the digital color multifunction printer 1 has at least the double color print mode.

Yet further, the case having been described in the present embodiment is such that the present invention is applied to the image processing device which uses color materials of C, M, Y, and K to generate double color image data for double color printing. However, this is not the only possibility. The present invention can be applied to an image processing device only if it generates double color image data for double color printing, using (i) a color material of K and (ii) a color material of a single color other than K or a combination of color materials of a plurality of chromatic colors.

Further, the case having been described in the present embodiment is such that the input image data is the full-color image data of RGB. However, this is not the only possibility. It is essential only that the input image data is multicolor image data for use in forming an image of three or more colors.

In the above embodiments, each section (each block) included in the digital color multifunction printer 1 may be realized by software by using a processor such as a CPU. In this case, the digital color multifunction printer 1 include: a CPU (central processing unit) for executing a control program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color multifunction printer 1 is provided with a computer-readable storage medium for storing program codes (such as executable program, intermediate code program, and source program) of control programs of the digital color multifunction printer 1 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color multifunction printer 1 may be arranged so as to be connectable to a communication network so that the program code is supplied to the digital color multifunction printer 1 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color multifunction printer 1 is not necessarily realized by means of software, and may be realized by hardware logic. Each block of the digital color multifunction printer 1 may be a combination of hardware carrying out some of the processes and the computing means controlling the hardware and executing software for the other processes.

As described above, an image processing device of the present invention is an image processing device that generates double color image data for formation of a double color image on a basis of multicolor image data which is image data of a multicolor image, the double color image being expressed by (i) a black color material and (ii) a single chromatic color material or a combination of a plurality of chromatic color materials and being composed of black and other single color, the image processing device comprising: a saturation calculating section that calculates saturation of each pixel on a basis of the multicolor image data; a pixel determining section that determines a pixel as a chromatic pixel if the saturation of the pixel having been calculated by the saturation calculating section is not less than a preset threshold value, and determines a pixel as an achromatic pixel if the saturation of the pixel having been calculated by the saturation calculating section is less than the threshold value; an achromatic color data generating section that generates pixel data for formation of a black image, for the pixel having been determined as the achromatic pixel by the pixel determining section; a chromatic color data generating section that generates pixel data containing single color image data for formation of an image of the single color, for the pixel having been determined as the chromatic pixel by the pixel determining section; and a pixel data synthesizing section that generate the double color image data by combining the pixel data having been generated for the achromatic pixel by the achromatic color data generating section and the pixel data having been generated for the chromatic pixel by the chromatic color data generating section, the chromatic color data generating section generating, for the chromatic pixel, the single color image data such that a density of the single color increases with increase in the saturation of the chromatic pixel having been calculated by the saturation calculating section.

Further, an image processing method of the present invention is an image processing method of generating double color image data for formation of a double color image on a basis of multicolor image data which is image data of a multicolor image, the double color image being expressed by (i) a black color material and (ii) a single chromatic color material or a combination of a plurality of chromatic color materials and being composed of black and other single color, the method comprising: a saturation calculating step of calculating saturation of each pixel on a basis of the multicolor image data; a pixel determining step of determining a pixel as a chromatic pixel if the saturation of the pixel having been calculated in the saturation calculating step is not less than a preset threshold value, and determining a pixel as an achromatic pixel if the saturation of the pixel having been calculated in the saturation calculating step is less than the threshold value; an achromatic color image data generating step of generating pixel data for formation of a black image, for the pixel having been determined as the achromatic pixel in the pixel determining step; a chromatic color image data generating step of generating pixel data containing single color image data for formation of an image of the single color, for the pixel having been determined as the chromatic pixel in the pixel determining step; and a pixel data synthesizing step of generating the double color image data by combining the pixel data having been generated for the achromatic pixel in the achromatic color image data generating step and the pixel data having been generated for the chromatic pixel in the chromatic color image data generating step, in the chromatic color image data generating step, generating the single color image data, for the chromatic pixel, such that a density of the single color increases with increase in the saturation of the chromatic pixel having been calculated in the saturation calculating step.

According to the above-described image processing device and image processing method, the saturation of each pixel is calculated on the basis of the multicolor image data, a pixel is determined as the chromatic pixel if the saturation of the pixel thus calculated is not less than the preset threshold value, and a pixel is determined as the achromatic pixel if the saturation of the pixel thus calculated is less than the threshold value. Pixel data for formation of a black image is generated for the pixel having been determined as the achromatic pixel, and pixel data containing single color image data for formation of an image of the single color is generated for the pixel having been determined as the chromatic pixel. Further, for the chromatic pixel, the single color image data is generated such that a density of the single color increases with increase in the saturation of the chromatic pixel thus calculated.

In this manner, the single color image data is generated, for the chromatic pixel, such that a density of the single color increases with increase in the saturation of the chromatic pixel thus calculated. This makes it possible to form a high-contrast double color image that exhibits rich tone reproduction. Moreover, it is possible to express the boundary between the chromatic region consisting of a group of the chromatic pixels and the achromatic region consisting of a group of the achromatic pixels, with natural and smooth gradation.

Still further, an image processing device of the present invention may be arranged such that the image processing device further includes: a lightness calculating section that calculates lightness of each pixel on a basis of the multicolor image data, and the achromatic color data generating section generates, for the achromatic pixel, the pixel data such that a density of black increases with decrease in the lightness of the achromatic pixel having been calculated by the lightness calculating section.

According to the above arrangement, it is possible to increase contrast of the achromatic region. This makes it possible to form a higher-contrast double color image that exhibits rich tone reproduction.

Yet further, an image processing device of the present invention may be arranged such that the image processing device further includes: a lightness calculating section that calculates lightness of each pixel on a basis of the multicolor image data, and the chromatic color data generating section generates, for the chromatic pixel, pixel data for formation of an image containing the single color and black, the pixel data being such that a density of black increases with decrease in the lightness of the chromatic pixel having been calculated by the lightness calculating section.

According to the above arrangement, it is possible to further increase contrast of the chromatic region.

Further, an image processing device of the present invention may be arranged such that the image processing device further includes: a lightness calculating section that calculates lightness of each pixel on a basis of the multicolor image data, the pixel determining section determines a region consisting of a group of the chromatic pixels adjacent to each other as a chromatic region, and determines a region consisting of a group of the achromatic pixels adjacent to each other as an achromatic region, and the chromatic color data generating section generates the pixel data for formation of an image containing the single color and black for the chromatic pixel which is at a distance of less than a predetermined value from a boundary between the chromatic region and the achromatic region, while generating the pixel data for formation of an image containing only the single color for the chromatic pixel which is at a distance of not less than the predetermined value from the boundary.

Still further, an image processing device of the present invention may be arranged such that the image processing device further includes: a lightness calculating section that calculates lightness of each pixel on a basis of the multicolor image data, the pixel determining section determines a region consisting of a group of the chromatic pixels adjacent to each other as a chromatic region, and determines a region consisting of a group of the achromatic pixels adjacent to each other as an achromatic region, and the chromatic color data generating section corrects the pixel data for the chromatic pixel, so that a density of black decreases with distance from the chromatic pixel to the boundary between the chromatic region to which the chromatic pixel belongs and the achromatic region.

According to the above arrangements, it is possible to enhance contrast of an edge of the chromatic region, i.e. an area on the side of the chromatic region at the boundary between the chromatic region and the achromatic region.

Yet further, an image processing device of the present invention may be arranged such that the single color is a color expressed by a color material of any one color selected from cyan, magenta, and yellow or a color expressed by a combination of color materials of any two colors selected from cyan, magenta, and yellow.

According to the above arrangement, it is possible to form a high-contrast double color image that can express the boundary between the chromatic region and the achromatic region with natural and smooth gradation and exhibit rich tone reproduction, as a double color image for image formation using color materials of cyan, magenta, yellow, and black.

An image forming apparatus of the present invention includes: any of the above-described image processing devices; and an image output section that forms a double color image on a printing medium, the double color image corresponding to double color image data having been generated by the image processing device.

According to the above arrangement, it is possible to form a high-contrast double color image that can express the boundary between the chromatic region and the achromatic region with natural and smooth gradation and exhibit rich tone reproduction.

The present invention is not limited to the aforementioned embodiments and is susceptible of various changes within the scope of the accompanying claims. That is, an embodiment obtained by suitable combinations of technical means within the scope of the claims are also included within the technical scope of the present invention.

INDUSTRIAL APPLICABILITY

The present invention is applicable to an image processing device that generates image data of a double color image consisting of an achromatic color and a chromatic color.

REFERENCE SIGNS LIST

1 Digital color multifunction printer (image forming apparatus)
2 Image input device (image input section)
3 Image processing device
4 Image output device (image output section)
5 Communication device (image input section)
6 Operation panel 7 Main control section
15 Color correction section
22 Double color correction section
31 Lightness/saturation calculating section (saturation calculating section, lightness calculating section)
32 Achromatic/chromatic color determining section (pixel determining section)
33 Achromatic color data generating section
34 Specified color data generating section (chromatic color data generating section)
35 Gamma correction section (pixel data synthesizing section)
36 Color balance adjusting section
37 Total amount regulating section

The invention claimed is:

1. An image processing device that generates double color image data for formation of a double color image on a basis of multicolor image data which is image data of a multicolor image, the double color image being expressed by (i) a black color material and (ii) a single chromatic color material or a combination of a plurality of chromatic color materials and being composed of black and other single color, the image processing device comprising:
a saturation calculating section that calculates saturation of each pixel on a basis of the multicolor image data;
a pixel determining section that determines a pixel as a chromatic pixel if the saturation of the pixel having been calculated by the saturation calculating section is not less than a preset threshold value, and determines a pixel as an achromatic pixel if the saturation of the pixel having been calculated by the saturation calculating section is less than the threshold value;
an achromatic color data generating section that generates pixel data for formation of a black image, for the pixel having been determined as the achromatic pixel by the pixel determining section;
a chromatic color data generating section that generates pixel data containing single color image data for formation of an image of the single color, for the pixel having been determined as the chromatic pixel by the pixel determining section; and
a pixel data synthesizing section that generate the double color image data by combining the pixel data having been generated for the achromatic pixel by the achromatic color data generating section and the pixel data having been generated for the chromatic pixel by the chromatic color data generating section,
the chromatic color data generating section generating, for the chromatic pixel, the single color image data such that a density of the single color increases with increase in the saturation of the chromatic pixel having been calculated by the saturation calculating section.

2. The image processing device according to claim 1, further comprising:
a lightness calculating section that calculates lightness of each pixel on a basis of the multicolor image data,
the achromatic color data generating section generating, for the achromatic pixel, the pixel data such that a density of black increases with decrease in the lightness of the achromatic pixel having been calculated by the lightness calculating section.

3. The image processing device according to claim 1, further comprising:
a lightness calculating section that calculates lightness of each pixel on a basis of the multicolor image data,
the chromatic color data generating section generating, for the chromatic pixel, pixel data for formation of an image containing the single color and black, the pixel data being such that a density of black increases with decrease in the lightness of the chromatic pixel having been calculated by the lightness calculating section.

4. The image processing device according to claim 1, further comprising:
a lightness calculating section that calculates lightness of each pixel on a basis of the multicolor image data,
the pixel determining section determining a region consisting of a group of the chromatic pixels adjacent to each other as a chromatic region, and determining a region consisting of a group of the achromatic pixels adjacent to each other as an achromatic region,
the chromatic color data generating section generating the pixel data for formation of an image containing the single color and black for the chromatic pixel which is at a distance of less than a predetermined value from a boundary between the chromatic region and the achromatic region, while generating the pixel data for formation of an image containing only the single color for the chromatic pixel which is at a distance of not less than the predetermined value from the boundary.

5. The image processing device according to claim further comprising:
a lightness calculating section that calculates lightness of each pixel on a basis of the multicolor image data,
the pixel determining section determining a region consisting of a group of the chromatic pixels adjacent to each other as a chromatic region, and determining a region consisting of a group of the achromatic pixels adjacent to each other as an achromatic region,
the chromatic color data generating section correcting the pixel data for the chromatic pixel, so that a density of black decreases with distance from the chromatic pixel to the boundary between the chromatic region to which the chromatic pixel belongs and the achromatic region.

6. The image processing device according to claim 1, wherein
the single color is a color expressed by a color material of any one color selected from cyan, magenta, and yellow or a color expressed by a combination of color materials of any two colors selected from cyan, magenta, and yellow.

7. An image forming apparatus comprising:
an image processing device according to claim 1; and
an image output section that forms a double color image on a printing medium, the double color image corresponding to double color image data having been generated by the image processing device.

8. An image processing method of generating double color image data for formation of a double color image on a basis of multicolor image data which is image data of a multicolor image, the double color image being expressed by (i) a black color material and (ii) a single chromatic color material or a combination of a plurality of chromatic color materials and being composed of black and other single color,
the method comprising:
a saturation calculating step of calculating saturation of each pixel on a basis of the multicolor image data;
a pixel determining step of determining a pixel as a chromatic pixel if the saturation of the pixel having been calculated in the saturation calculating step is not less than a preset threshold value, and determining a pixel as an achromatic pixel if the saturation of the pixel having been calculated in the saturation calculating step is less than the threshold value;

an achromatic color image data generating step of generating pixel data for formation of a black image, for the pixel having been determined as the achromatic pixel in the pixel determining step;

a chromatic color image data generating step of generating pixel data containing single color image data for formation of an image of the single color, for the pixel having been determined as the chromatic pixel in the pixel determining step; and a pixel data synthesizing step of generating the double color image data by combining the pixel data having been generated for the achromatic pixel in the achromatic color image data generating step and the pixel data having been generated for the chromatic pixel in the chromatic color image data generating step, wherein in the chromatic color image data generating step, generating the single color image data, for the chromatic pixel, such that a density of the single color increases with increase in the saturation of the chromatic pixel having been calculated in the saturation calculating step.

\* \* \* \* \*